United States Patent
Dewa

(10) Patent No.: US 10,869,104 B2
(45) Date of Patent: Dec. 15, 2020

(54) RECEIVING APPARATUS, RECEPTION METHOD, TRANSMITTING APPARATUS, TRANSMISSION METHOD, AND PROGRAM

(71) Applicant: Saturn Licensing LLC, New York, NY (US)

(72) Inventor: Yoshiharu Dewa, Tokyo (JP)

(73) Assignee: Saturn Licensing LLC, New York, NY (US)

(*) Notice: Subject to any disclaimer, the term of this patent is extended or adjusted under 35 U.S.C. 154(b) by 0 days.

(21) Appl. No.: 14/125,434

(22) PCT Filed: Apr. 9, 2013

(86) PCT No.: PCT/JP2013/060734
§ 371 (c)(1),
(2) Date: Dec. 11, 2013

(87) PCT Pub. No.: WO2013/157447
PCT Pub. Date: Oct. 24, 2013

(65) Prior Publication Data
US 2015/0033252 A1    Jan. 29, 2015

(30) Foreign Application Priority Data
Apr. 19, 2012   (JP) .................................. 2012-095854

(51) Int. Cl.
*H04N 21/232*   (2011.01)
*H04N 21/233*   (2011.01)
(Continued)

(52) U.S. Cl.
CPC ........ *H04N 21/8173* (2013.01); *H04H 60/13* (2013.01); *H04N 21/2353* (2013.01);
(Continued)

(58) Field of Classification Search
None
See application file for complete search history.

(56) References Cited

U.S. PATENT DOCUMENTS

2003/0217369 A1* 11/2003 Heredia ........... H04N 21/23617
725/152
2005/0193388 A1*  9/2005 Hayes, Jr. ................ G06F 8/61
717/174
(Continued)

FOREIGN PATENT DOCUMENTS

| CN | 101185326 A | 5/2008 |
|---|---|---|
| CN | 101341744 A | 1/2009 |

(Continued)

OTHER PUBLICATIONS

Tatsuya Shimoji, "The Basis of BML," The Journal of the Institute of Image Information and Television Engineers, May 1, 2007 (May 1, 2007), vol. 61, No. 5, pp. 648-652.
(Continued)

*Primary Examiner* — Brian T Pendleton
*Assistant Examiner* — Jean D Saint Cyr
(74) *Attorney, Agent, or Firm* — Lerner, David, Littenberg, Krumholz & Mentlik, LLP

(57) ABSTRACT

The present invention relates to a receiving apparatus, a reception method, a transmitting apparatus, a transmission method, and a program that enable management information of an application program to be transmitted without changing existing facilities.
An AIT acquiring unit acquires AIT information to control an operation of an application program executed in linkage with data broadcasting content, which is described in a meta element of a BML document of the data broadcasting content transmitted by a broadcasting wave of digital broadcasting, and an HTML browser unit controls an operation of a linked application distributed through the Internet, on the
(Continued)

basis of the AIT information acquired by the AIT acquiring unit. The present invention can be applied to a television receiver that receives the broadcasting wave of the digital broadcasting.

19 Claims, 14 Drawing Sheets

(51) Int. Cl.
*H04N 21/235* (2011.01)
*H04N 21/258* (2011.01)
*H04N 21/435* (2011.01)
*H04N 21/81* (2011.01)
*H04N 21/8543* (2011.01)
*H04H 60/13* (2008.01)
*H04N 21/6547* (2011.01)
*H04N 21/643* (2011.01)

(52) U.S. Cl.
CPC ..... *H04N 21/435* (2013.01); *H04N 21/64322* (2013.01); *H04N 21/6547* (2013.01); *H04N 21/8543* (2013.01)

(56) References Cited

U.S. PATENT DOCUMENTS

| | | | |
|---|---|---|---|
| 2006/0280443 A1 | 12/2006 | Horii | |
| 2007/0140651 A1 | 6/2007 | Hashimoto et al. | |
| 2007/0220564 A1* | 9/2007 | Yano et al. | 725/86 |
| 2007/0223867 A1* | 9/2007 | Hwang | G02B 6/10 385/123 |
| 2008/0250101 A1* | 10/2008 | Tanaka et al. | H04N 21/47214 709/203 |
| 2008/0271048 A1* | 10/2008 | Fradkov | G06Q 20/04 719/311 |
| 2009/0106801 A1* | 4/2009 | Horii | H04N 21/43615 725/91 |
| 2010/0202278 A1* | 8/2010 | Ikeda | G11B 20/10 369/275.3 |
| 2011/0038616 A1* | 2/2011 | Kawakami | G11B 27/11 386/353 |
| 2011/0041144 A1* | 2/2011 | Araki | G06F 9/541 719/328 |
| 2011/0075029 A1* | 3/2011 | Maruyama | H04N 21/4856 348/468 |
| 2011/0093895 A1 | 4/2011 | Lee et al. | |
| 2011/0179067 A1* | 7/2011 | Dalvi | G06F 16/2379 707/769 |
| 2011/0179089 A1* | 7/2011 | Idicula | G06F 17/2205 707/803 |
| 2012/0174170 A1 | 7/2012 | Dewa et al. | |
| 2015/0033252 A1 | 1/2015 | Dewa | |
| 2015/0052224 A1* | 2/2015 | Kitahara | H04N 21/2353 709/219 |
| 2015/0121416 A1* | 4/2015 | Moon | H04N 21/4122 725/30 |

FOREIGN PATENT DOCUMENTS

| | | |
|---|---|---|
| CN | 102045597 A | 5/2011 |
| JP | 2011-066556 A | 3/2011 |
| JP | 6345424 B2 | 6/2018 |

OTHER PUBLICATIONS

Diigital Hoso ni Okeru Application Jikko Kankyo ARIB STD-B23, edition 1.2, Assoication of Radio Industries and Businesses, Jul. 29, 2009 (Jul. 29, 2009), pp. 58-59.
Chinese Office Action for Application No. 201380001666.2, dated Mar. 2, 2017.
Hybrid Broadcast Broadband TV, ETSI TS 102 796, Jun. 2010, pp. 1-75, V.1.1, Technical Specification.
Hori, Akihiro et al., "Japanese Datacasting Coding Scheme BML", Proceedings of the IEEE, Jan. 2006, pp. 312-317, vol. 94, No. 1.
Shimoji, Tatsuya, "The Basis of BML," The Journal of the Institute of Image Information and Television Engineers, May 1, 2007 (May 1, 2007), vol. 61, No. 5, pp. 648-652. [The International Search Report provides a concise description of the relevance of this document.].
Diigital Hoso ni Okeru Application Jikko Kankyo ARIB STD-B23, edition 1.2, Assoication of Radio Industries and Businesses, Jul. 29, 2009 Jul. 29, 2009), pp. 58-59. [The International Search Report provides a concise description of the relevance of this document.].
International Search Report corresponding to PCT/JP2013/060734, dated Jul. 16, 2013.
Japanese Office Action for Application No. 2013-550687, dated May 30, 2017.
Supplementary European Search Report for Application No. EP1378015, dated Aug. 27, 2015.
Association of Radio Industries and Businesses, "ARIB STD-B23 Version 1.1-E1 English Translation Application Execution Engine Platform for Digital Broad Casting", Feb. 5, 2004, pp. 1-332, Retrieved from the Internet: URL: http:/www.arib.or.jp/english/html/overview/doc/6-STD-B23v1_1-E1.pdf [retrieved on Mar. 18, 2015].
ETSI, "Digital Video Broadcasting (DVB); Signaling and carnage of interactive applications and Services in Hybrid broadcast/broadband environments", ETSI TS 102 809 V1.1.1 (Technical Specification), Jan. 7, 2010, pp. 1-98, Retrieved from the Internet: URL: http://www.etsi.org/deliver/etsi_ts/102800_102899/102809/01.01.01_60/ts_102809v010101p.pdf [retrieved on May 27, 2014].
Argentinian Office Action for AR20130101192 dated Nov. 6, 2018.
Argentinian Office Action for AR20130101192 dated Oct. 30, 2018.

* cited by examiner

FIG. 1

```
<html>
<head>
<meta name="keywords" content="HTML, CSS, XML" />
<title> meta sample</title>
</head>
<body>
<div>
<p>
sample text
</p>
</div>
</body>
</html>
```

FIG. 2

```
<xsd:simpleType name="VisibilityDescriptor">
    <xsd:restriction base="xsd:string">
        <xsd:enumeration value="NOT_VISIBLE_ALL"/>
        <xsd:enumeration value="NOT_VISIBLE_USERS"/>
        <xsd:enumeration value="VISIBLE_ALL"/>
    </xsd:restriction>
</xsd:simpleType>
```

FIG. 3

```
<html>
<head>
<meta name="AIT:VisibilityDescriptor" content="VISIBLE_ALL" />
<title> meta sample</title>
</head>
<body>
<div>
<p>
sample text
</p>
</div>
</body>
</html>
```

FIG. 4

```
<xsd:complexType name="MhpVersion">
<xsd:sequence minOccurs="1">
<xsd:element name="profile" type="ipi:Hexadecimal16bit"/>
<xsd:element name="versionMajor" type="ipi:Hexadecimal8bit"/>
<xsd:element name="versionMinor" type="ipi:Hexadecimal8bit"/>
<xsd:element name="versionMicro" type="ipi:Hexadecimal8bit"/>
</xsd:sequence>
</xsd:complexType>
```

FIG. 5

```
<html>
<head>
<meta name="AIT:MhpVersion.profile" content="FFFF" />
<meta name="AIT:MhpVersion.versionMajor" content="FF" />
<meta name="AIT:MhpVersion.versionMinor" content="FF" />
<meta name="AIT:MhpVersion.versionMicro" content="FF" />
<title> meta sample</title>
</head>
<body>
<div>
<p>
sample text
</p>
</div>
</body>
</html>
```

FIG. 6

```
<xsd:complexType name="StorageCapabilities">
<xsd:sequence minOccurs="0">
<xsd:element name="storageProperty" type="mhp:StorageType"/>
<xsd:element name="isStorable" type="xsd:boolean"/>
<xsd:element name="canCache" type="xsd:boolean"/>
</xsd:sequence>
<xsd:attribute name="launchableFromBroadcast" type="xsd:boolean" use="required"/>
<xsd:attribute name="launchableCompletelyFromCache" type="xsd:boolean" use="required"/>
<xsd:attribute name="launchableWithOlderVersion" type="xsd:boolean" use="required"/>
</xsd:complexType>
```

FIG. 7

```
<html>
<head>
<meta name="AIT:StorageCapabilities"
content="launchableFromBroadcast=false, launchableCompletelyFromCache=true, launchableWith
OlderVersion=true" />
<meta name="AIT:StorageCapabilities.storageProperty" content="BROADCAST-RELATED" />
<meta name="AIT:StorageCapabilities.isStorable" content="true" />
<meta name="AIT:StorageCapabilities.canCache " content="true" />
<title> meta sample</title>
</head>
<body>
<div>
<p>
sample text
</p>
</div>
</body>
</html>
```

FIG. 8

```xml
<?xml version="1.0" encoding="UTF-8"?>
<mhp:ServiceDiscovery xsi:schemaLocation="TM-MIS0068_r2/mis_xmlait.xsd"
                      xmlns:xsi="http://www.w3.org/2001/XMLSchema-instance"
                      xmlns:mpeg7="urn:tva:mpeg7:2005"
                      xmlns:mhp="urn:dvb:mhp:2009"
                      xmlns:ipi="urn:dvb:metadata:iptv:sdns:2008-1">
  <mhp:ApplicationDiscovery DomainName="test.com">
    <mhp:ApplicationList>
      <mhp:Application>
        <mhp:appName Language="eng" />
        <mhp:applicationIdentifier>
          <mhp:orgId>19</mhp:orgId>
          <mhp:appId>1</mhp:appId>
        </mhp:applicationIdentifier>
        <mhp:applicationDescriptor>
          <mhp:type>application/vnd.ctv.xhtml+xml</mhp:type>
          <mhp:controlCode>AUTOSTART</mhp:controlCode>
          <mhp:visibility>VISIBLE_ALL</mhp:visibility>
          <mhp:serviceBound>false</mhp:serviceBound>
          <mhp:priority>1</mhp:priority>
          <mhp:version>01</mhp:version>
          <mhp:mhpVersion>
             <mhp:profile>0</mhp:profile>
             <mhp:versionMajor>1</mhp:versionMajor>
             <mhp:versionMinor>1</mhp:versionMinor>
             <mhp:versionMicro>1</mhp:versionMicro>
          </mhp:mhpVersion>
        </mhp:applicationDescriptor>
        <mhp:applicationTransport xsi:type="mhp:HTTPTransportType">
          <mhp:URLBase>http://dl.dropbox.com/u/52423597/</mhp:URLBase>
        </mhp:applicationTransport>
        <mhp:applicationLocation>related.html</mhp:applicationLocation>
      </mhp:Application>
<mhp:Application>
        <mhp:appName Language="eng" />
        <mhp:applicationIdentifier>
          <mhp:orgId>19</mhp:orgId>
          <mhp:appId>2</mhp:appId>
        </mhp:applicationIdentifier>
        <mhp:applicationDescriptor>
          <mhp:type>application/vnd.ctv.xhtml+xml</mhp:type>
          <mhp:controlCode>PRESENT</mhp:controlCode>
          <mhp:visibility>VISIBLE_ALL</mhp:visibility>
          <mhp:serviceBound>false</mhp:serviceBound>
          <mhp:priority>1</mhp:priority>
          <mhp:version>01</mhp:version>
          <mhp:mhpVersion>
             <mhp:profile>0</mhp:profile>
             <mhp:versionMajor>1</mhp:versionMajor>
             <mhp:versionMinor>1</mhp:versionMinor>
             <mhp:versionMicro>1</mhp:versionMicro>
          </mhp:mhpVersion>
        </mhp:applicationDescriptor>
        <mhp:applicationTransport xsi:type="mhp:HTTPTransportType">
          <mhp:URLBase>http://dl.dropbox.com/u/52423597/</mhp:URLBase>
        </mhp:applicationTransport>
        <mhp:applicationLocation>related.html</mhp:applicationLocation>
      </mhp:Application>
    </mhp:ApplicationList>
  </mhp:ApplicationDiscovery>
</mhp:ServiceDiscovery>
```

FIG. 9

```
<applicationDiscovery contents=
    xsi:schemaLocation="TM-MISMOS://a/s xmlat:xsd"
    xmlns:xsi="http://www.w3.org/2001/XMLSchema-instance"
    xmlns:mpeg7="urn:tva:mpeg7:2008"
    xmlns:mtv="urn:tva:metadata:2008"
    xmlns:tp="urn:oc:metadata:iptv-sds:2009-1"
    xmlns="urn:oc:metadata:iptv-sds:2009-1" content="DomainName="test.com"/>

<meta name="AIT:ServiceDiscovery.ApplicationDiscovery.Application" content=""/> // 1st application marker
<meta name="AIT:ServiceDiscovery.ApplicationDiscovery.Application.ApplicationName" content="language=eng"/>

<meta name="AIT:ServiceDiscovery.ApplicationDiscovery.Application.ApplicationIdentifier.orgId" content="19"/>
<meta name="AIT:ServiceDiscovery.ApplicationDiscovery.Application.ApplicationIdentifier.appId" content="1"/>
<meta name="AIT:ServiceDiscovery.ApplicationDiscovery.Application.ApplicationDescriptor.type" content="applicationDescriptor.xmlns="/>
<meta name="AIT:ServiceDiscovery.ApplicationDiscovery.Application.ApplicationDescriptor.controlCode" content="AUTOSTART"/>
<meta name="AIT:ServiceDiscovery.ApplicationDiscovery.Application.ApplicationDescriptor.visibility" content="VISIBLE_ALL"/>
<meta name="AIT:ServiceDiscovery.ApplicationDiscovery.Application.ApplicationDescriptor.serviceBound" content="false"/>
<meta name="AIT:ServiceDiscovery.ApplicationDiscovery.Application.ApplicationDescriptor.priority" content="1"/>
<meta name="AIT:ServiceDiscovery.ApplicationDiscovery.Application.ApplicationDescriptor.version" content="0"/>
<meta name="AIT:ServiceDiscovery.ApplicationDiscovery.Application.ApplicationDescriptor.appVersion.versionMajor" content=""/>
<meta name="AIT:ServiceDiscovery.ApplicationDiscovery.Application.ApplicationDescriptor.appVersion.versionMinor" content="1"/>
<meta name="AIT:ServiceDiscovery.ApplicationDiscovery.Application.ApplicationDescriptor.appVersion.versionMicro" content="1"/>

<meta name="AIT:ServiceDiscovery.ApplicationDiscovery.Application" content=""/> // 2nd application marker
<meta name="AIT:ServiceDiscovery.ApplicationDiscovery.Application.ApplicationName" content="language=eng"/>

<meta name="AIT:ServiceDiscovery.ApplicationDiscovery.Application.ApplicationIdentifier.orgId" content="19"/>
<meta name="AIT:ServiceDiscovery.ApplicationDiscovery.Application.ApplicationIdentifier.appId" content="2"/>
<meta name="AIT:ServiceDiscovery.ApplicationDiscovery.Application.ApplicationDescriptor.type" content="applicationDescriptor.xmlns="/>
<meta name="AIT:ServiceDiscovery.ApplicationDiscovery.Application.ApplicationDescriptor.controlCode" content="PRESENT"/>
<meta name="AIT:ServiceDiscovery.ApplicationDiscovery.Application.ApplicationDescriptor.visibility" content="VISIBLE_ALL"/>
<meta name="AIT:ServiceDiscovery.ApplicationDiscovery.Application.ApplicationDescriptor.serviceBound" content="false"/>
<meta name="AIT:ServiceDiscovery.ApplicationDiscovery.Application.ApplicationDescriptor.priority" content="1"/>
<meta name="AIT:ServiceDiscovery.ApplicationDiscovery.Application.ApplicationDescriptor.version" content="0"/>
<meta name="AIT:ServiceDiscovery.ApplicationDiscovery.Application.ApplicationDescriptor.appVersion.versionMajor" content=""/>
<meta name="AIT:ServiceDiscovery.ApplicationDiscovery.Application.ApplicationDescriptor.appVersion.versionMinor" content="1"/>
<meta name="AIT:ServiceDiscovery.ApplicationDiscovery.Application.ApplicationDescriptor.appVersion.versionMicro" content="2"/>

<meta name="AIT:ServiceDiscovery.ApplicationDiscovery.Application.ApplicationTransport" content="" xsi:type="tp:HTTPTransportType"/>
<meta name="AIT:ServiceDiscovery.ApplicationDiscovery.Application.ApplicationTransport.URLBase" content="http://dropbox.com/hu/6142253/"/>
<meta name="AIT:ServiceDiscovery.ApplicationDiscovery.Application.ApplicationLocation" content="related.html"/>
```

FIG. 13

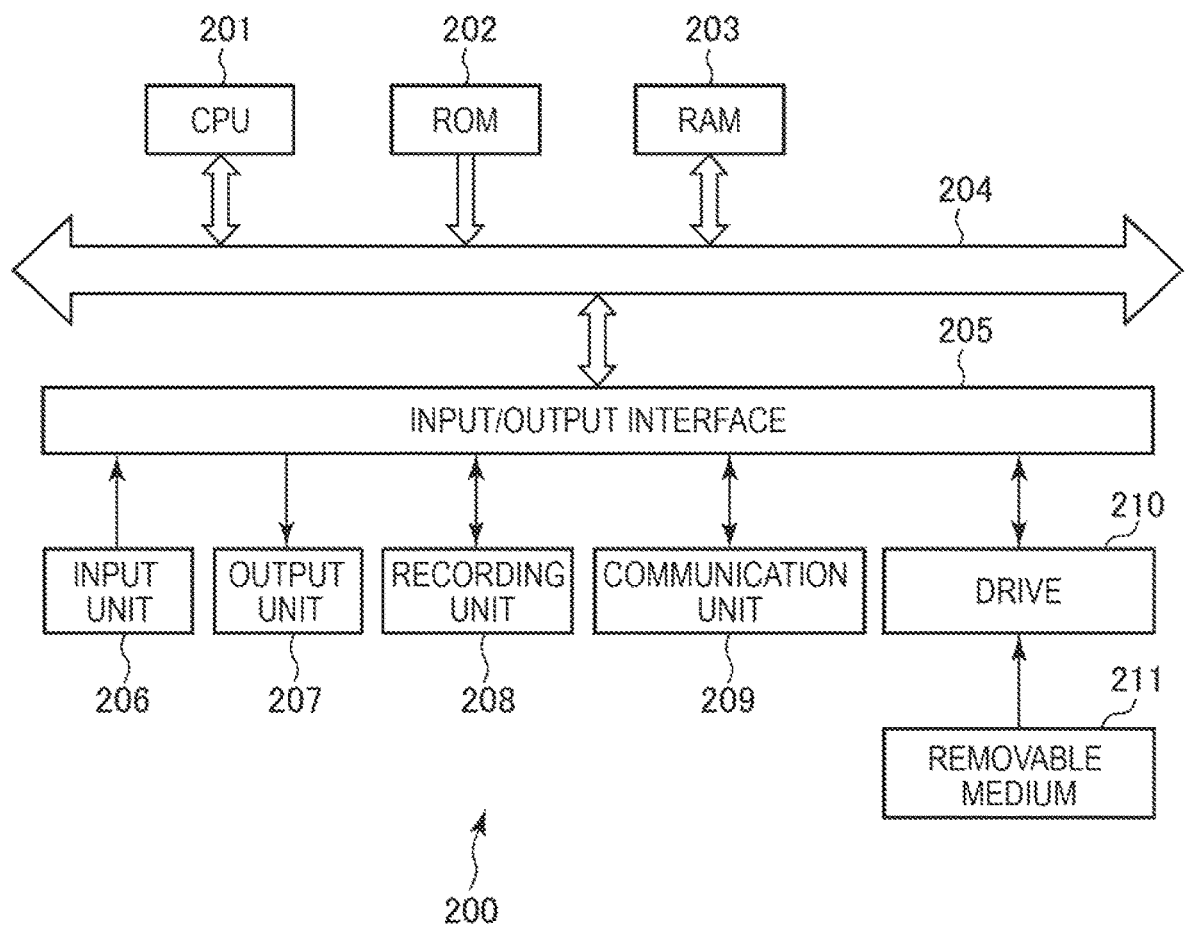

RECEIVING APPARATUS, RECEPTION METHOD, TRANSMITTING APPARATUS, TRANSMISSION METHOD, AND PROGRAM

CROSS-REFERENCE TO RELATED APPLICATION

The present application is a national phase entry under 35 U.S.C. § 371 of International Application No. PCT/JP2013/060734 filed Apr. 9, 2013, published on Oct. 24, 2013 as WO 2013/157447 A1, which claims priority from Japanese Patent Application No. JP 2012-095854 filed in the Japanese Patent Office on Apr. 19, 2012.

TECHNICAL FIELD

The present invention relates to a receiving apparatus, a reception method, a transmitting apparatus, a transmission method, and a program and more particularly, to a receiving apparatus, a reception method, a transmitting apparatus, a transmission method, and a program that enable management information of an application program to be transmitted without changing existing facilities.

BACKGROUND ART

AIT (Application Information Table) has been known as an interactive application management broadcasting signal established by European digital broadcasting standardization organization (DVB: Digital Video Broadcasting) (for example, refer to Patent Literature 1).

All of MHEG (Multimedia and Hypermedia Experts Group), MHP (Multimedia Home Platform), and HbbTV (Hybrid broadcast broadband TV) to be European data broadcasting services control an operation such as a start or an end of an application program that operates in linkage with broadcasting content by the AIT.

Citation List

Patent Literature

Patent Literature 1: JP2011-66556A

SUMMARY OF INVENTION

Technical Problem

A signal of the AIT is overlapped to a broadcasting wave and is transmitted. However, in countries such as Japan and the United States that adopt the digital broadcasting standard not performing transmission of the AIT under present circumstances, there are demands for managing the application program using the AIT.

However, in a broadcasting system that does not perform transmission of the AIT, because overlapping the signal of the AIT to the broadcasting wave leads to a change in existing facilities, an introducing cost increases. For this reason, it is necessary to take measures to transmit the AIT without changing a transmitter or a receiver in the existing broadcasting system.

As a method not to change the existing transmitter, a method of transmitting the AIT converted with an XML format on the basis of the DVB standard (ETSI TS 102 809) as one file, using a data carousel transmission method in data broadcasting, has been suggested. However, if this method is used, the existing receiver that has been already sold may cause malfunction.

As such, under present circumstances, a technical method to transmit the AIT without changing the existing facilities is not established.

The present invention has been made in view of the above circumstances and enables management information of an application program to be transmitted without changing existing facilities.

Solution to Problem

According to a first embodiment of the present technology, there is provided a receiving apparatus including a receiving unit that receives broadcasting content transmitted by a broadcasting wave of digital broadcasting, an acquiring unit that acquires application management information to control an operation of an application program executed in linkage with data broadcasting content, which is described in an area to describe any information in a markup language describing the data broadcasting content transmitted by the broadcasting wave, and a control unit that controls the operation of the application program, according to the acquired application management information.

The application management information is information in which a life cycle of the application program is defined.

The application management information is described in an area that does not affect an operation of the data broadcasting content.

The markup language is BML (Broadcast Markup Language), and the application management information is described in a meta element of a BML document to be first provided.

The application management information is information that is obtained by equivalently converting the information in which the life cycle of the application program specified in advance is defined.

The application management information is information that is obtained by converting XML-AIT, which is obtained by expressing AIT (Application Information Table) specified by DVB (Digital Video Broadcasting) with XML (Extensible Markup Language), according to a predetermined rule.

The application program is distributed through the Internet.

The receiving apparatus may be an independent apparatus and may be an internal block configuring one apparatus.

A reception method or a program according to the first aspect of the present invention is a reception method or a program that corresponds to the receiving apparatus according to the first aspect of the present invention described above.

A reception apparatus, a reception method, and a program according to the first aspect of the present invention receive broadcasting content transmitted by a broadcasting wave of digital broadcasting, acquire application management information to control an operation of an application program executed in linkage with data broadcasting content, which is described in an area to describe any information in a markup language describing the data broadcasting content transmitted by the broadcasting wave, and control the operation of the application program, according to the acquired application management information.

A transmitting apparatus according to a second aspect of the present invention includes a transmitting unit that transmits broadcasting content transmitted by a broadcasting wave of digital broadcasting and a generating unit that generates application management information to control an operation of an application program executed in linkage with data broadcasting content, which is described in an area to describe any information in a markup language describing the data broadcasting content transmitted by the broadcasting wave. The transmitting unit transmits the data broadcasting content transmitted by the broadcasting wave.

The transmitting apparatus may be an independent apparatus and may be an internal block configuring one apparatus.

A transmission method according to the second aspect of the present invention is a transmission method that corresponds to the transmitting apparatus according to the second aspect of the present invention described above.

A transmitting apparatus and a transmission method according to the second aspect of the present invention transmit broadcasting content transmitted by a broadcasting wave of digital broadcasting, generate application management information to control an operation of an application program executed in linkage with data broadcasting content, which is described in an area to describe any information in a markup language describing the data broadcasting content transmitted by the broadcasting wave, and transmit the data broadcasting content transmitted by the broadcasting wave.

Advantageous Effects of Invention

According to the first and second aspects of the present invention, management information of an application program can be transmitted without changing existing facilities.

BRIEF DESCRIPTION OF DRAWINGS

FIG. 1 is a diagram illustrating a meta element in an HTML document.

FIG. 2 is a diagram illustrating an example of a notation of a visibility descriptor in XML-AIT.

FIG. 3 is a diagram illustrating an example of a notation of a meta element in a simply type.

FIG. 4 is a diagram illustrating an example of a notation of a MhpVersion descriptor in XML-AIT.

FIG. 5 is a diagram illustrating an example of a notation of a meta element in a first complex type.

FIG. 6 is a diagram illustrating a description example of a StorageCapabilities descriptor in XML-AIT.

FIG. 7 is a diagram illustrating an example of a notation of a meta element in a second complex type.

FIG. 8 is a diagram illustrating a description example of XML-AIT.

FIG. 9 is a diagram illustrating a description example of AIT information.

FIG. 13 is a diagram illustrating a description example of AIT information.

FIG. 14 is a diagram illustrating a configuration example of a computer.

DESCRIPTION OF EMBODIMENTS

Figure 10:
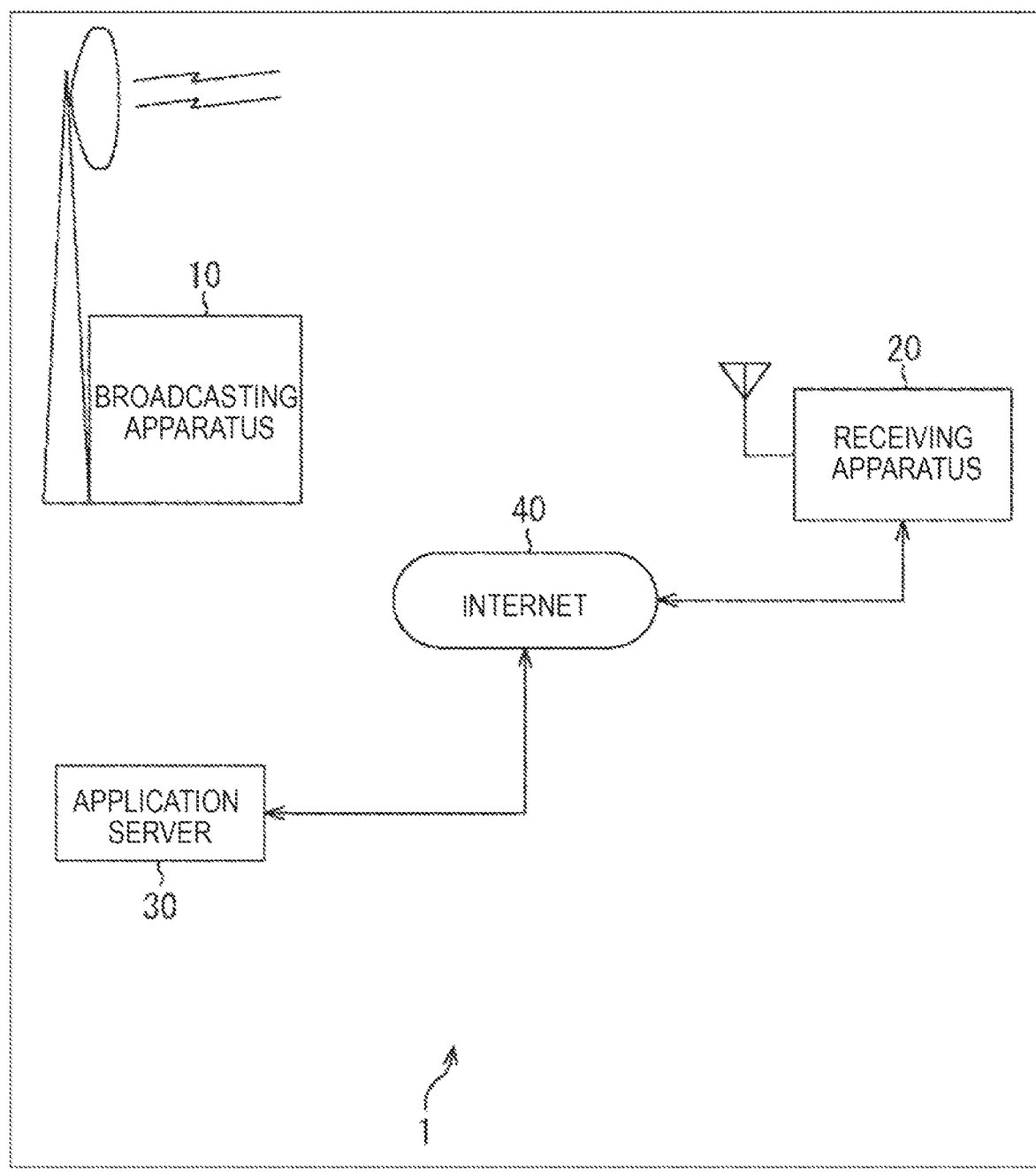
FIG. 10 is a diagram illustrating a configuration of an embodiment of a broadcasting system to which the present invention is applied.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Outline of Present Invention

In the specifications of HbbTV of Europe and ATSC2.0 (Advanced Television Systems Committee 2.0) of the United States in addition to BML (Broadcast Markup Language) used by data broadcasting of Japan, a data structure of an HTML (HyperText Markup Language) system is adopted for the realization of an interactive function. In this data structure, there is an area where any metadata called a meta element can be described.

As illustrated in FIG. 1, a meta element is described in a head element of an HTML document. In the meta element, a name attribute and a content attribute are described. A name of a property is designated in the name attribute and a value of the property is designated in the content attribute.

That is, because a value of the name attribute is not specified, the value of the name attribute can be designated as any value, by combining the name attribute and the content attribute. In an example of FIG. 1, "HTML", "CSS", and "XML" are designated as keywords.

When AIT is expressed by XML (Extensible Markup Language) according to the specification of ETSI TS 102 809 to be the standard of DVB, as an XML schema, it is expressed by a simple type or a complex type. The expression of the AIT with the XML is called XML-AIT.

Here, the simple type (simpleType) means a simple type of not including an attribute or a child element such as a character string or a numerical value. In addition, the complex type (complexType) means a type of including a child element in content of an attribute or an element.

In addition, a complex type in which there is an attribute element and a complex type in which there is no attribute element exist in complex types. Hereinafter, of the complex types, the complex type in which there is no attribute element is called a first complex type and the complex type in which there is an attribute element is called a second complex type.

That is, the XML-AIT is expressed by any type of the simple type, the first complex type, and the second complex type. Hereinafter, how to express the XML-AIT by the meta element according to each type will be described.

(1. Simply Type)

First, the simple type will be described with reference to FIGS. 2 and 3.

FIG. 2 illustrates a notation of a Visibility descriptor in XML-AIT, which is specified in ETSI TS 102 809. The corresponding notation is described in "5.2.6.3 XML encoding" of ETSI TS 102 809.

As illustrated in FIG. 2, in the case of the Visibility descriptor, "VisibilityDescriptor" is designated as a name attribute of a simpleType element. In addition, "NOT_VISIBLE_ALL", "NOT_VISIBLE_USERS", and "VISIBLE_ALL" are designated as values of enumeration elements.

The notation of FIG. 2 can be expressed by the meta element by performing conversion according to a conversion rule of the simple type to be described later.

(Conversion Rule of Simple Type)

(1) An element name (in an example of FIG. 2, "VisibilityDescriptor") of the XML-AIT is defined by adding a prefix such as "AIT:" to a name attribute of the meta element. However, "AIT:" is an example of the prefix and other character string can be added.

(2) A value of the XML-AIT is designated in the content attribute of the meta element.

That is, if the notation of FIG. 2 is converted according to the conversion rule of the simple type, for example, as illustrated in FIG. 3, in the meta element, "AIT: Visibility-Descriptor" is designated in a name attribute and "VISIBLE_ALL" is designated in a content attribute.

As such, the XML-AIT that is expressed by the simple type can be expressed by the meta element.

(2. First Complex Type)

Next, the first complex type will be described with reference to FIGS. 4 and 5.

FIG. 4 illustrates a notation of a MhpVersion descriptor in XML-AIT, which is specified in ETSI TS 102 809. The corresponding notation is described in "5.2.5.3 XML encoding" of ETSI TS 102 809.

As illustrated in FIG. 4, in the case of the MhpVersion descriptor, "MhpVersion" is designated as a name attribute of a complexType element. In addition, "profile", "versionMajor", "versionMinor", and "versionMicro" are designated in name attributes of elements and "ipi:Hexadecimal16 bit", "ipi:Hexadecimal8 bit", "ipi:Hexadecimal8 bit", and "ipi:Hexadecimal8 bit" are designated as values of type attributes.

The notation of FIG. 4 can be expressed by the meta element by performing conversion according to a conversion rule of the first complex type to be described later.

(Conversion Rule of First Complex Type)

(1) An element name (in an example of FIG. 4, "MhpVersion") of the XML-AIT is defined by adding a prefix such as "AIT:" to a name attribute of a meta element. However, "AIT:" is an example of the prefix and other character string can be added. In addition, because the content attribute is null, this row is not generated.

(2) However, as an exception of (1), the case (for example, "Application") in which the same element name repetitively appears is handled as a separator by describing a content attribute=" ".

(3) In this case, the content attribute of the meta element is made to become null. This is because the content attribute becomes essential in the meta element.

(4) The name attributes specified in the element of the XML-AIT is enumerated in the name attribute of the meta element by adding a period to an element name of the XML-AIT. However, the period is an example and a comma, an underbar, a hyphen, or other delimiters can be used.

(5) A value of the type attribute specified in the element of the XML-AIT is allocated to the content attribute of the meta element.

That is, if the notation of FIG. 4 is converted according to the conversion rule of the first complex type, for example, as illustrated in FIG. 5, in the meta element, when "AIT: MhpVersion.profile" is designated in the name attribute, "FFFF" is designated in the content attribute thereof and when "AIT:MhpVersion.versionMajor" is designated in the name attribute, "FF" is designated in the content attribute thereof. In addition, when "AIT:MhpVersion.versionMinor" is designated in the name attribute, "FF" is designated in the content attribute thereof and when "AIT:MhpVersion.versionMicro" is designated in the name attribute, "FF" is designated in the content attribute thereof.

As such, the XML-AIT that is expressed by the first complex type can be expressed by the meta element.

(3. Second Complex Type)

Finally, the second complex type will be described with reference to FIGS. 6 and 7.

FIG. 6 illustrates a notation of a StorageCapabilities descriptor in XML-AIT, which is specified in ETSI TS 102 809. The corresponding notation is described in "5.2.11.3 XML encoding" of ETSI TS 102 809.

As illustrated in FIG. 6, in the case of the StorageCapabilities descriptor, "StorageCapabilities" is designated as a name attribute of a complexType element. In addition, "storageProperty", "is Storable", and "canCache" are designated in name attributes of elements and "mhp.StorageType", "xsd:boolean", and "xsd:boolean" are designated as values of type attributes.

In addition, "launchableFromBroadcast", "launchableCompletelyFromCache", and "launchableWithOlderVersion" are designated in name attributes of attribute elements and "xsd:boolean", "xsd:boolean", and "xsd:boolean" are designated as values of type attributes.

The notation of FIG. 6 can be expressed by the meta element by performing conversion according to a conversion rule of the second complex type to be described later.

(Conversion Rule of Second Complex Type)

(1) An element name (in an example of FIG. 6, "StorageCapabilities") of the XML-AIT is defined by adding a prefix such as "AIT:" to a name attribute of a meta element. However, "AIT:" is an example of the prefix and other character string can be added.

(2) The name attribute specified in the attribute of the XML-AIT is divided by a comma and is enumerated in the name attribute of the meta element. However, instead of the comma, other delimiters can be used. In addition, a value of the attribute is expressed by a predetermined symbol such as "=".

(3) The name attribute specified in the element of the XML-AIT is enumerated in the name attribute of the meta element, by adding a period to an element name of the XML-AIT. However, instead of the period, other delimiters can be used.

(4) The value of the type attribute specified in the element of the XML-AIT is allocated to the content attribute of the meta element.

That is, if the notation of FIG. 6 is converted according to the conversion rule of the second complex type, for example, as illustrated in FIG. 7, in the meta element, when "AIT:StorageCapabilities" is designated in the name attribute, "launchableFromBroadcast=false, launchableCompletelyFromCache=true,launchable WithOlderVersion=true" are designated in the content attribute thereof.

In addition, when "AIT: StorageCapabilities.storageProperty" is designated in the name attribute, "BROADCAST-RELATED" is designated in the content attribute thereof. In addition, when "AIT: StorageCapabilities.isStorable" is designated in the name attribute, "true" is designated in the content attribute thereof. In addition, when "AIT: StorageCapabilities.canCache" is designated in the name attribute, "true" is designated in the content attribute thereof.

As such, the XML-AIT that is expressed by the second complex type can be expressed by the meta element.

As described above, the XML-AIT is converted according to a predetermined conversion rule according to each type, so that the corresponding XML-AIT can be expressed by the meta element. For example, the XML-AIT of FIG. 8 is expressed by the meta element, as illustrated in FIG. 9, by applying the conversion rule. In the case of this example, a control command to be "AUTOSTART" is designated in a linked application identified by an ID to be "1" and a control command to be "PRESENT" is designated in a linked application identified by an ID to be "2".

Here, the linked application is an application program that is executed in linkage with broadcasting content such as a television program and is distributed by a predetermined server connected to the Internet. For example, the linked application is composed of an HTML document such as HTML5 (Hyper Text Markup Language 5).

In addition, "AUTOSTART", "PRESENT", "KILL", and "PREFETCH" are designated as control commands. The "AUTOSTART" is a command that causes a receiver to automatically execute a linked application immediately. Meanwhile, "PRESENT" is a command that shows whether the linked application can be executed, when the linked application is not automatically executed and the linked application is executed at any timing according to an external request.

The "KILL" is a command that causes the receiver to end the execution of the linked application. In addition, the "PREFETCH" is a command that causes the linked application to be acquired in advance.

In addition, if the transmitter can generate content (hereinafter, referred to as AIT information) of a meta element corresponding to the XML-AIT and transmit the content, the receiver that has received the content can control an operation of the linked application in linkage with broadcasting content, according to the AIT information.

For example, in Japan, BML is adopted as a markup language describing data broadcasting content. However, the AIT information can be embedded in a meta element in a head element of a startup document (Startup.bml). That is, the AIT information is included in the startup document transmitted as existing data broadcasting by the data carousel transmission method.

Thereby, the receiver extracts a character string of which a name attribute starts from "AIT:" among the meta elements included in the startup document and extracts AIT information therefrom. Because a version of a BML document such as the startup document is managed according to the data carousel transmission method, when content of the AIT information is updated, version information of a module is updated, so that the receiver can detect a change in the content of the AIT information. In this case, the content of the AIT information is rewritten and updated according to the updated startup document. In addition, because the frequency of transmitting the startup document is high, the transmitter can securely transmit the AIT information to the receiver.

Meanwhile, the receiver controls the operation of the linked application, according to the control command obtained from the AIT information.

In the receiver, when a BML browser to display data broadcasting content performs syntax analysis of the BML document, the BML browser skips meta elements in which content of name attributes cannot be understood among the meta elements, without analyzing the meta elements. For this reason, even though the AIT information is described in the meta element, data broadcasting content can be displayed without being affected by the AIT information.

In addition, the conversion rules described above are exemplary. Other conversion rules that can perform semantically equivalent conversion may be used.

The outline of the present invention has been described.

[Specific Configuration]

Next, a specific configuration to realize the present invention will be described.

(Configuration Example of Broadcasting System)

FIG. 10 is a diagram illustrating a configuration of an embodiment of a broadcasting system to which the present invention is applied.

A broadcasting system 1 includes a broadcasting apparatus 10, a receiving apparatus 20, and an application server 30. In addition, the receiving apparatus 20 and the application server 30 are mutually connected through the Internet 40.

The broadcasting apparatus 10 is configured to transmit a broadcasting signal of broadcasting content such as a television program or a CM by a broadcasting wave of digital broadcasting.

The receiving apparatus 20 receives a broadcasting signal transmitted from the broadcasting apparatus 10 by the broadcasting wave of the digital broadcasting and acquires video and audio of broadcasting content. The receiving apparatus 20 outputs the acquired video to a display and outputs the audio to a speaker.

The receiving apparatus 20 may exist as a single body and may be embedded in a television receiver or a video recorder. In addition, the detailed configuration of the receiving apparatus 20 will be described below with reference to FIG. 11.

In addition, the broadcasting apparatus 10 generates AIT information to control an operation of the linked application, includes the AIT information in the broadcasting signal, and transmits the broadcasting signal.

The AIT information is obtained by converting the XML-AIT according to a predetermined conversion rule. In addition, the AIT information is described in the startup document of the data broadcasting content and is transmitted by the broadcasting wave of the digital broadcasting by the data carousel transmission method. That is, the data carousel transmission method is a transmission method used for the data broadcasting. However, the data carousel transmission method is also used to transmit the AIT information.

In the AIT information, information such as a control command to control the operation of the linked application is described. For example, in the AIT information, a URL (Uniform Resource Locator) of the application server 30 is described as information of an acquisition destination of the linked application.

The receiving apparatus 20 acquires the linked application set to be automatically executed immediately, on the basis of the AIT information, and executes the linked application. At this time, the receiving apparatus 20 has access to the application server 30 through the Internet 40, according to the URL described in the AIT information, and acquires the linked application.

The application server 30 manages the linked application. The application server 30 is provided by a broadcaster who broadcasts broadcasting content by the broadcasting apparatus 10.

The application server 30 distributes the managed linked application to the receiving apparatus 20 through the Internet 40, according to an inquiry from the receiving apparatus 20.

The broadcasting system 1 is configured as described above.

(Configuration Example of Receiving Apparatus)

Figure 11:
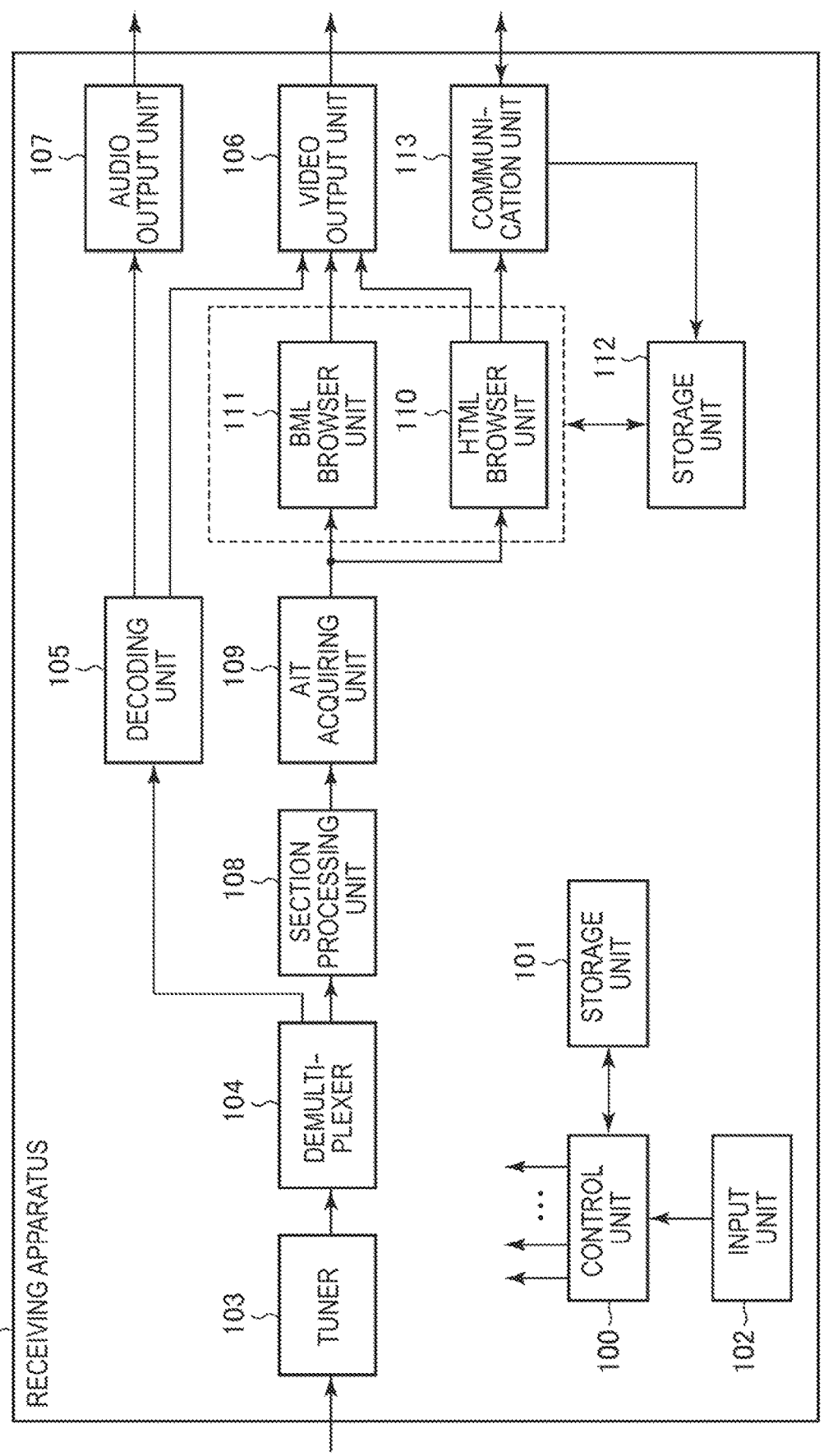
FIG. 11 is a diagram illustrating a configuration of an embodiment of a receiving apparatus to which the present invention is applied.

FIG. 11 is a diagram illustrating a configuration of an embodiment of a receiving apparatus to which the present invention is applied.

The receiving apparatus 20 includes a control unit 100, a storage unit 101, an input unit 102, a tuner 103, a demultiplexer 104, a decoding unit 105, a video output unit 106, an audio output unit 107, a section processing unit 108, an AIT acquiring unit 109, an HTML browser unit 110, a BML browser unit 111, a storage unit 112, and a communication unit 113.

The control unit 100 controls an operation of an individual unit of the receiving apparatus 20. The storage unit 101 stores various data according to control from the control unit 100.

The input unit 102 is composed of, for example, a light receiving unit to receive infrared rays. The input unit 102 receives a manipulation of a remote controller by a user and supplies a manipulation signal according to the manipulation to the control unit 100. The control unit 100 controls the operation of the individual unit of the receiving apparatus 20, according to the manipulation signal supplied from the input unit 102.

The tuner 103 extracts a digital broadcasting signal of a channel selection instructed channel from the received digital broadcasting signal, demodulates the digital broadcasting signal, and supplies a transport stream obtained as a result thereof to the demultiplexer 104.

The demultiplexer 104 separates the transport stream supplied from the tuner 103 into a video stream, an audio stream, and section data. The demultiplexer 104 supplies the video stream and the audio stream to the decoding unit 105. In addition, the demultiplexer 104 supplies the section data to the section processing unit 108.

The decoding unit 105 decodes the video stream supplied from the demultiplexer 104 and supplies a video signal obtained as a result thereof to the video output unit 106. The video output unit 106 outputs the video signal corresponding to the video of the broadcasting content supplied from the decoding unit 105 to an external display (not illustrated in the drawings).

In addition, the decoding unit 105 decodes the audio stream supplied from the demultiplexer 104 and supplies an audio signal obtained as a result thereof to the audio output unit 107. The audio output unit 107 outputs the audio signal corresponding to the audio of the broadcasting content supplied from the decoding unit 105 to an external speaker (not illustrated in the drawings).

The section processing unit 108 executes various processes for section data supplied from the demultiplexer 104. For example, the section processing unit 108 performs section filtering for a DSM-CC (Digital Storage Media-Command and Control) section transmitted by the data carousel transmission method, among the section data supplied from the demultiplexer 104. In addition, the section processing unit 108 executes an analysis process of DII (Download Info Indication) and DDB (Download Data Block) obtained as a result thereof.

In addition, the section processing unit 108 supplies data such as image data or a BML document included in the DDB to be obtained as a result of the analysis process of the DII and the DDB to the AIT acquiring unit 109 in a module unit.

The AIT acquiring unit 109 acquires a startup document, on the basis of the data of the module unit supplied from the section processing unit 108. When there is a character string of which a name attribute starts from "AIT:" among meta elements included in the startup document, the AIT acquiring unit 109 extracts AIT information therefrom. The AIT acquiring unit 109 generates an AIT database that stores information obtained from the extracted AIT information. The AIT information that is stored in the AIT database is supplied to the HTML browser unit 110. The AIT database is stored in the storage unit 101 and is appropriately read.

The HTML browser unit 110 executes the HTML browser stored in the storage unit 112, on the basis of the AIT information supplied from the AIT acquiring unit 109, and controls the operation of the linked application read from the storage unit 112. The HTML browser unit 110 generates a video signal of the linked application and supplies the video signal to the video output unit 106. The video output unit 106 outputs a video signal corresponding to the video in which the linked application is overlapped to the broadcasting content, to the external display.

In addition, the AIT acquiring unit 109 supplies the data of the module unit supplied from the section processing unit 108 to the BML browser unit 111.

The BML browser unit 111 executes the BML browser stored in the storage unit 112, on the basis of the data of the module unit supplied from the AIT acquiring unit 109, generates the video signal of the data broadcasting content, and supplies the video signal to the video output unit 106. The video output unit 106 outputs the video signal corresponding to the video in which the data broadcasting content is overlapped to the broadcasting content, to the external display.

The communication unit 113 has access to the application server 30 through the Internet 40, according to control from the HTML browser unit 110, and requests for the linked application. The communication unit 113 receives the linked application distributed from the application server 30 and stores the linked application by the storage unit 112.

In the configuration example of FIG. 11, the video signal and the audio signal are output to the outside. However, when the receiving apparatus 20 is configured as the television receiver, such signals are supplied to the embedded display and speaker.

The receiving apparatus 20 is configured as described above.

(Linked Application Control Process)

Figure 12:
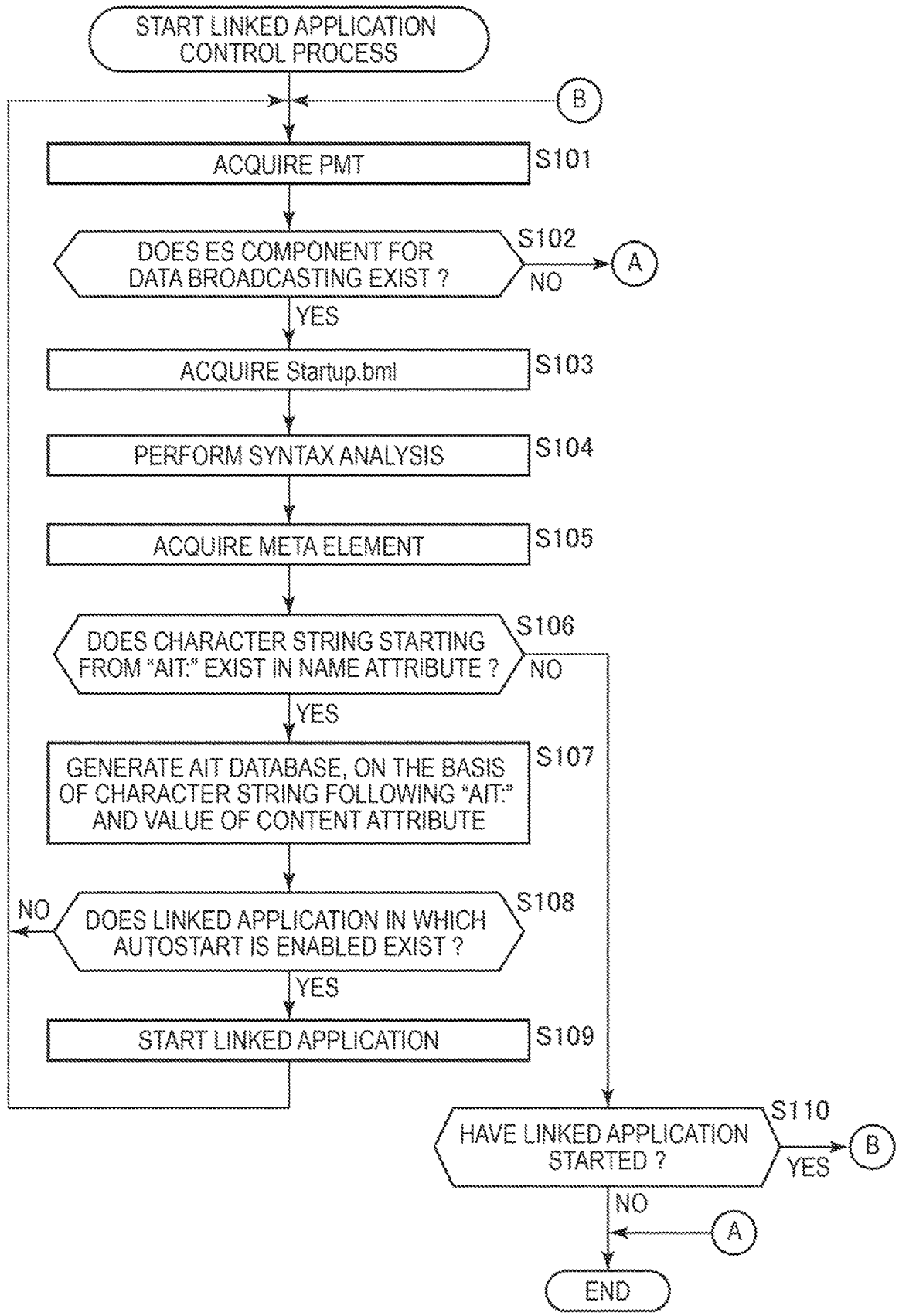
FIG. 12 is a flowchart illustrating a linked application control process.

Next, a linked application control process will be described with reference to a flowchart of FIG. 12.

In step S101, the control unit 100 acquires a PMT from the stream separated by the demultiplexer 104. Here, the PMT (Program Map Table) stores each PID (Packet ID) such as video or audio included in a certain program.

In step S102, the control unit 100 determines whether an elementary stream component for data broadcasting exists in the stream separated by the demultiplexer 104, on the basis of the acquired PMT. When it is determined in step S102 that the elementary stream component for the data broadcasting exists, the process proceeds to step S103.

In step S103, the AIT acquiring unit 109 acquires the startup document (Startup.bml), from the data transmitted in the module unit.

In step S104, the AIT acquiring unit 109 performs the syntax analysis of the acquired startup document.

In step S105, the AIT acquiring unit 109 acquires a meta element described in the startup document, according to a result of the syntax analysis.

In step S106, the AIT acquiring unit 109 determines whether a character string starting from "AIT:" exists in a name attribute of the acquired meta element. When it is determined in step S106 that the corresponding character string exists, the process proceeds to step S107.

In step S107, the AIT acquiring unit 109 generates the AIT database storing the information acquired from the AIT information, on the basis of the character string following "AIT:" and the value of the content attribute.

In step S108, the HTML browser unit 110 determines whether the linked application in which AUTOSTART is enabled exists, according to the control command stored in the AIT database. When it is determined in step S108 that the linked application in which AUTOSTART is enabled exists, the process proceeds to step S109.

In step S109, the HTML browser unit 110 starts the linked application in which AUTOSTART is enabled. Thereby, video in which the linked application is overlapped to the television program is displayed on the display. As such, the receiving apparatus 20 can perform an operation in which the XML-AIT seems to be transmitted from the broadcasting apparatus 10, by generating the AIT database.

In step S109, if the linked application starts, the process returns to step S101 and the following processes are repeated. In addition, when it is determined in step S108 that the linked application in which AUTOSTART is enabled does not exist, the linked application to be started immediately does not exist. For this reason, the process returns to step S101 and the following processes are repeated.

When it is determined in step S102 that the elementary stream component for the data broadcasting exists, the data broadcasting of the corresponding broadcasting content is not performed and the data broadcasting content and the linked application do not start. For this reason, the linked application control process ends. In this case, only the video such as the television program is displayed on the display.

In addition, when it is determined in step S106 that the character string starting from "AIT:" does not exist in the name attribute of the meta element, the process proceeds to step S110. In step S110, the HTML browser unit 110 determines whether the linked application has started.

When it is determined in step S110 that the linked application has started, the process returns to step S101 and the following processes are repeated. That is, when the linked application has started, the AIT information for the corresponding linked application is further transmitted. In addition, when the version information of the module transmitted by the data carousel transmission method is updated and the content of the AIT information is changed, the AIT database according to the content of the AIT information is generated and the operation of the linked application is controlled.

In addition, when it is determined in step S110 that the linked application has not started, the linked application does not start and thus, the linked application control process ends. In this case, video in which data broadcasting information such as a weather forecast is overlapped to a television program is displayed on the display. For example, the receivers may correspond to only the existing data broadcasting and may not correspond to the linked application. In the case of these receivers, normal data broadcasting content starts by the above process.

The linked application control process has been described.

The case in which AUTOSTART is designated as the control command has been described. However, when other control command such as PRESENT or KILL is designated, the receiving apparatus 20 executes the linked application control process according to the control command. For example, in the case in which a certain program ends and a next program starts, when it is desired to end a linked application for the previous program and start a linked application for the next program, the meta element illustrated in FIG. 13 is described as the AIT information in the startup document and is transmitted by the data carousel transmission method.

In FIG. 13, KILL is designated as a control command for a linked application identified by an ID to be "1", which is described in an area of "1st application". In addition, AUTOSTART is designated as a control command for a linked application identified by an ID to be "2", which is described in an area of "2nd application".

In the receiving apparatus 20, when the startup document in which the meta element is described is acquired, the AIT database is generated on the basis of the AIT information described in the meta element of FIG. 13, by the AIT acquiring unit 109. In addition, according to the control command stored in the corresponding AIT database, the HTML browser unit 110 ends the linked application for the previous program and starts the linked application for the next program.

As described above, in the present invention, the transmitter embeds the AIT information in the meta element of the BML document for the startup and transmits the information using the existing data broadcasting, so that the receiver can extract the AIT information and control the operation of the linked application according to the AIT information. Thereby, in the broadcasting system, the AIT information to control the linked application can be transmitted without changing the existing facilities.

The AIT information has been described as the application management information to manage a life cycle of the linked application. The present invention is not limited thereto and other application management information may be used.

[Configuration Example of Computer to which Present Technology is Applied]

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

FIG. 14 is a block diagram showing a hardware configuration example of a computer that performs the above-described series of processing using a program.

In the computer 200, a central processing unit (CPU) 201, a read only memory (ROM) 202 and a random access memory (RAM) 203 are mutually connected by a bus 204.

An input/output interface 205 is also connected to the bus 204. An input unit 206, an output unit 207, a storage unit 208, a communication unit 209, and a drive 210 are connected to the input/output interface 205.

The input unit 206 is configured from a keyboard, a mouse, a microphone or the like. The output unit 207 is configured from a display, a speaker or the like. The storage unit 208 is configured from a hard disk, a non-volatile memory or the like. The communication unit 209 is configured from a network interface or the like. The drive 210 drives a removable media 211 such as a magnetic disk, an optical disk, a magneto-optical disk, a semiconductor memory or the like.

In the computer 200 configured as described above, the CPU 201 loads a program that is stored, for example, in the storage unit 208 onto the RAM 203 via the input/output interface 205 and the bus 204, and executes the program. Thus, the above-described series of processing is performed.

Programs to be executed by the computer 200 (the CPU 201) are provided being recorded in the removable media 211 which is a packaged media or the like. Also, programs may be provided via a wired or wireless transmission medium, such as a local area network, the Internet or digital satellite broadcasting.

In the computer 200, by inserting the removable media 211 into the drive 210, the program can be installed in the storage unit 908 via the input/output interface 205. Further, the program can be received by the communication unit 209 via a wired or wireless transmission media and installed in the storage unit 908. Moreover, the program can be installed in advance in the ROM 202 or the storage unit 908.

It should be noted that the program executed by a computer 200 may be a program that is processed in time series according to the sequence described in this specification or a program that is processed in parallel or at necessary timing such as upon calling.

A processing step herein for describing a program which causes the computer 200 to perform various processing does not necessarily have to be processed chronologically in the order described in a flow chart. It also includes processing performed in parallel or individually (for example, parallel processing or processing by an object).

The program may be processed by one computer (processor) or by a plurality of computers in a distributed manner. Further, the program may be performed after being transferred to a remote computer.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

The embodiment of the present technology is not limited to the above-described embodiment. It should be understood by those skilled in the art that various modifications, combinations, sub-combinations and alterations may occur depending on design requirements and other factors insofar as they are within the scope of the appended claims or the equivalents thereof.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technology may also be configured as below.

(1)
A receiving apparatus including:
a receiving unit that receives broadcasting content transmitted by a broadcasting wave of digital broadcasting;
an acquiring unit that acquires application management information to control an operation of an application program executed in linkage with broadcasting content, which is described in an area to describe any information in a markup language describing the data broadcasting content transmitted by the broadcasting wave; and
a control unit that controls the operation of the application program, according to the acquired application management information.

(2)
The receiving apparatus according to (1),
wherein the application management information is information in which a life cycle of the application program is defined.

(3)
The receiving apparatus according to (1) or (2),
wherein the application management information is described in an area that does not affect an operation of the data broadcasting content.

(4)
The receiving apparatus according to (3),
wherein the markup language is Broadcast Markup Language (BML), and
the application management information is described in a meta element of a BML document to be first provided.

(5)
The receiving apparatus according to any one of (1) to (4),
wherein the application management information is information that is obtained by equivalently converting the information in which the life cycle of the application program specified in advance is defined.

(6)
The receiving apparatus according to (5),
wherein the application management information is information that is obtained by converting Extensible Markup Language-Application Information Table (XML-AIT), which is obtained by expressing AIT specified by Digital Video Broadcasting (DVB) with XML, according to a predetermined rule.

(7)
The receiving apparatus according to any one of (1) to (6),
wherein the application program is distributed through the Internet.

(8)
A reception method of a receiving apparatus, the method including:
a step of causing the receiving apparatus to receive broadcasting content transmitted by a broadcasting wave of digital broadcasting;
a step of causing the receiving apparatus to acquire application management information to control an operation of an application program executed in linkage with data broadcasting content, which is described in an area to describe any information in a markup language describing the data broadcasting content transmitted by the broadcasting wave; and
a step of causing the receiving apparatus to control the operation of the application program, according to the acquired application management information.

(9)
A program for causing a computer to function as:
a receiving unit that receives broadcasting content transmitted by a broadcasting wave of digital broadcasting;
an acquiring unit that acquires application management information to control an operation of an application program executed in linkage with broadcasting content, which is described in an area to describe any information in a markup language describing the data broadcasting content transmitted by the broadcasting wave; and
a control unit that controls the operation of the application program, according to the acquired application management information.

(10)
A transmitting apparatus including:
a transmitting unit that transmits broadcasting content transmitted by a broadcasting wave of digital broadcasting; and
a generating unit that generates application management information to control an operation of an application program executed in linkage with data broadcasting content, which is described in an area to describe any information in a markup language describing the data broadcasting content transmitted by the broadcasting wave, wherein the transmitting unit transmits the data broadcasting content transmitted by the broadcasting wave.

(11)

A transmission method of a transmitting apparatus, the method including:

a step of causing the transmitting apparatus to transmit broadcasting content transmitted by a broadcasting wave of digital broadcasting;

a step of causing the transmitting apparatus to generate application management information to control an operation of an application program executed in linkage with data broadcasting content, which is described in an area to describe any information in a markup language describing the data broadcasting content transmitted by the broadcasting wave; and a step of causing the transmitting apparatus to transmit the data broadcasting content transmitted by the broadcasting wave.

REFERENCE SIGNS LIST

1 Broadcasting system
10 Broadcasting apparatus
20 Receiving apparatus
30 Application server
40 Internet
100 Control unit
101 Storage unit
103 Tuner
109 AIT acquiring unit
110 HTML browser unit
111 BML browser unit
112 Storage unit
113 Communication unit
200 Computer
201 CPU

The invention claimed is:

1. A receiving apparatus comprising:
a tuner configured to receive broadcasting content received from a broadcasting wave of digital broadcasting;
an acquiring circuitry configured to acquire, from the broadcasting wave of digital broadcasting including the broadcasting content, application management information to control an operation of an application program executed in linkage with data broadcasting content, which is represented in a markup language; and
a processor configured to control the operation of the application program, according to the acquired application management information,
wherein the application management information includes information that is obtained by converting information in which a life cycle of the application program specified in advance is defined by a control command for the application program, in which the control command is configured to control operation of the application program to end execution of the application program being executed at the receiving apparatus automatically without a request from an external apparatus, and
wherein the application management information includes information obtained according to a conversion rule for given application management information to control an operation of a given application program executed in linkage with the data broadcasting content and represented in the markup language, in which the conversion rule is according to a determination of a type of notation in which the given application management information is represented in the markup language.

2. The receiving apparatus according to claim 1, wherein the application management information is included in a document that does not affect an operation of the data broadcasting content.

3. The receiving apparatus according to claim 2, wherein the markup language includes a Broadcast Markup Language (BML).

4. The receiving apparatus according to claim 1, wherein the application management information includes information that is obtained by converting Extensible Markup Language-Application Information Table (XML-AIT).

5. The receiving apparatus according to claim 1, wherein the application program is received from the Internet.

6. A reception method of a receiving apparatus, the method comprising:
causing the receiving apparatus to receive broadcasting content received from a broadcasting wave of digital broadcasting;
causing the receiving apparatus to acquire, from the broadcasting wave of digital broadcasting including the broadcasting content, application management information to control an operation of an application program executed in linkage with data broadcasting content, which is represented in a markup language; and
causing the receiving apparatus to control the operation of the application program, according to the acquired application management information,
in which the application management information includes information that is obtained by converting information in which a life cycle of the application program specified in advance is defined by a control command for the application program, in which the control command is configured to control operation of the application program to end execution of the application program being executed at the receiving apparatus automatically without a request from an external apparatus,
wherein the application management information includes information obtained according to a conversion rule for given application management information to control an operation of a given application program executed in linkage with the data broadcasting content and represented in the markup language, in which the conversion rule is according to a determination of a type of notation in which the given application management information is represented in the markup language.

7. A non-transitory storage medium configured to record a program for causing a computer to function as:
a tuner configured to receive broadcasting content received from a broadcasting wave of digital broadcasting;
an acquiring circuitry configured to acquire, from the broadcasting wave of digital broadcasting including the broadcasting content, application management information to control an operation of an application program executed in linkage with data broadcasting content, which is represented in a markup language; and a controller configured to control the operation of the application program, according to the acquired application management information, in which the application management information includes information that is obtained by converting information in which a life cycle of the application program specified in advance is defined by a control command for the application program, in which the control command is configured to control operation of the application program to end execution of the application program being executed at a first apparatus at which the broadcasting content and the data broadcasting content are received automatically without a request from another apparatus external to the first apparatus, and wherein the application management information includes information obtained according to a conversion rule for given application management information to control an operation of a given application program executed in linkage with the data broadcasting content and represented in the markup language, in which the conversion rule is according to a determination of a type of notation in which the given application management information is represented in the markup language.

8. A transmitting apparatus comprising:

a memory; and a processing device configured to:

transmit broadcasting content transmitted by a broadcasting wave of digital broadcasting;

generate application management information to control an operation of an application program executed in linkage with data broadcasting content, which is represented in a markup language, in which the application management information is included in the broadcasting wave of digital broadcasting; and transmit the data broadcasting content transmitted by the broadcasting wave, in which the application management information includes information that is obtained by converting information in which a life cycle of the application program specified in advance is defined by a control command for the application program, in which the control command is configured to control operation of the application program to end execution of the application program being executed at a first apparatus at which the broadcasting content and the data broadcasting content are received automatically without a request from another apparatus external to the first apparatus, and wherein the application management information includes information obtained according to a conversion rule for given application management information to control an operation of a given application program executed in linkage with the data broadcasting content and represented in the markup language, in which the conversion rule is according to a determination of a type of notation in which the given application management information is represented in the markup language.

9. A transmission method of a transmitting apparatus, the method comprising:

causing the transmitting apparatus to transmit broadcasting content transmitted by a broadcasting wave of digital broadcasting;

causing the transmitting apparatus to generate application management information to control an operation of an application program executed in linkage with data broadcasting content, which is represented in a markup language, in which the application management information is included in the broadcasting wave of digital broadcasting; and causing the transmitting apparatus to transmit the data broadcasting content transmitted by the broadcasting wave, in which the application management information includes information that is obtained by converting information in which a life cycle of the application program specified in advance is defined described by a control command for the application program, in which the control command is configured to control operation of the application program to end execution of the application program being executed at a first apparatus at which the broadcasting content and the data broadcasting content are received automatically without a request from another apparatus external to the first apparatus, and wherein the application management information includes information obtained according to a conversion rule for given application management information to control an operation of a given application program executed in linkage with the data broadcasting content and represented in the markup language, in which the conversion rule is according to a determination of a type of notation in which the given application management information is represented in the markup language.

10. The receiving apparatus according to claim 1, wherein the markup language includes Extensible Markup Language (XML).

11. A television receiver comprising the receiving apparatus according to claim 1.

12. The receiving apparatus of claim 1, wherein (i) a first type of notation is determined by the determination when an attribute or another element is determined not to be included in the given application management information represented in the markup language and (i) a second type of notation is determined by the determination when a first element is determined to be included in content of an attribute or another element in the given application management information represented in the markup language.

13. The receiving apparatus of claim 12, wherein the second type of notation includes a first sub-type in which a given attribute element is determined to exist and a second sub-type in which no attribute element is determined to exist.

14. The reception method according to claim 6,
wherein the application management information is included in a document that does not affect an operation of the data broadcasting content.

15. The reception method according to claim 6,
wherein the application management information includes information that is obtained by converting Extensible Markup Language-Application Information Table (XML-AIT).

16. The reception method according to claim 6,
wherein the application program is received from the Internet.

17. The reception method according to claim 6, wherein the markup language includes Extensible Markup Language (XML).

18. The reception method according to claim 6, wherein (i) a first type of notation is determined by the determination when an attribute or another element is determined not to be included in the given application management information represented in the markup language and (i) a second type of notation is determined by the determination when a first element is determined to be included in content of an attribute or another element in the given application management information represented in the markup language.

19. The reception method of claim 18, wherein the second type of notation includes a first sub-type in which a given attribute element is determined to exist and a second sub-type in which no attribute element is determined to exist.

* * * * *